F. W. HOEFER.
TWIST DRILL.
APPLICATION FILED JAN. 20, 1910.
1,002,846.
Patented Sept. 12, 1911.
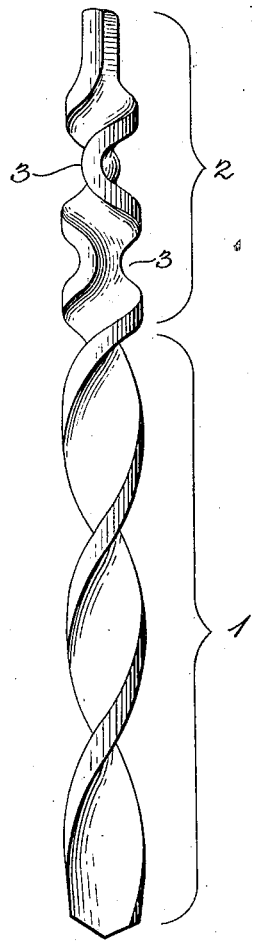

UNITED STATES PATENT OFFICE.

FREDERICK W. HOEFER, OF FREEPORT, ILLINOIS, ASSIGNOR TO HOEFER MANUFACTURING COMPANY, OF FREEPORT, ILLINOIS, A CORPORATION OF ILLINOIS.

TWIST-DRILL.

1,002,846. Specification of Letters Patent. Patented Sept. 12, 1911.

Application filed January 20, 1910. Serial No. 539,004.

*To all whom it may concern:*

Be it known that I, FREDERICK W. HOEFER, a citizen of the United States, residing at Freeport, in the county of Stephenson and State of Illinois, have invented certain new and useful Improvements in Twist-Drills, of which the following is a specification.

Because of the expensive material required to be used in the manufacture of twist drills, such drills are ordinarily made by twisting a flat or substantially flat bar. Difficulty has been encountered, however, in forming a satisfactory shank, owing to the fact that a shank consisting of an untwisted portion of a flat or substantially flat bar necessitates the use of a special chuck, and does not then permit of holding the drill rigidly. In order to form a shank that can be grasped by an ordinary twist-drill chuck it has been proposed to twist the shank in a spiral continuous with the spiral of the body portion, but in practice it has been found that a shank having a spiral twist therein tends to untwist due to the torsional stresses placed upon the drill, this tendency to untwist resulting in sufficient motion to cause the shank to loosen in the chuck.

By my invention I overcome the defect just pointed out. Instead of twisting the shank in a spiral continuous with the spiral of the bar, I form an irregular or zig-zag twist or bend in the shank. This construction overcomes the tendency to untwisting movement and thus provides a shank which does not tend to become loose in the drill socket.

The accompanying drawing is an elevation of a twist drill embodying the features of my invention.

In forming the drill, I take a flat or substantially flat bar and twist a portion thereof to form the body 1 of the drill. From the remaining portion 2 of the bar I make a shank by forming in said portion a zig-zag bend or plurality of alternate twists. In the form illustrated in the drawing, said bend may be considered to be a spiral having two reversals or deflections of its direction of rotation, as at 3 3. This manner of twisting the shank portion of the bar not only obviates the tendency to untwisting movement, but provides an ample amount of stock to be grasped by the chuck. The amount of stock or body thus provided may be increased, as herein shown, by decreasing the pitch of the twist in the shank of the drill, as compared with the pitch of the twist in the portion 1. Furthermore, the shank may be given a taper by suitably proportioning the different parts of the zig-zag bend.

I claim as my invention:

1. A drill having a shank twisted alternately in opposite directions.

2. A drill having a shank formed by twisting a flat bar alternately in opposite directions.

3. A drill having a shank portion integral with its body portion, said shank portion being alternately twisted in opposite directions.

4. A drill formed integrally from a flat bar with its body portion twisted in one direction and with its shank portion twisted alternately in opposite directions.

5. A twist drill formed from a flat bar and having a tapered shank, said shank being twisted alternately in opposite directions a plurality of times.

FREDERICK W. HOEFER.

Witnesses:
ADELA V. LEITHNER,
C. A. HOEFER.

Copies of this patent may be obtained for five cents each, by addressing the "Commissioner of Patents, Washington, D. C."